G. W. GARVIN.
LAND MARKER.
APPLICATION FILED MAY 17, 1912.
1,057,050.
Patented Mar. 25, 1913.
2 SHEETS—SHEET 1.
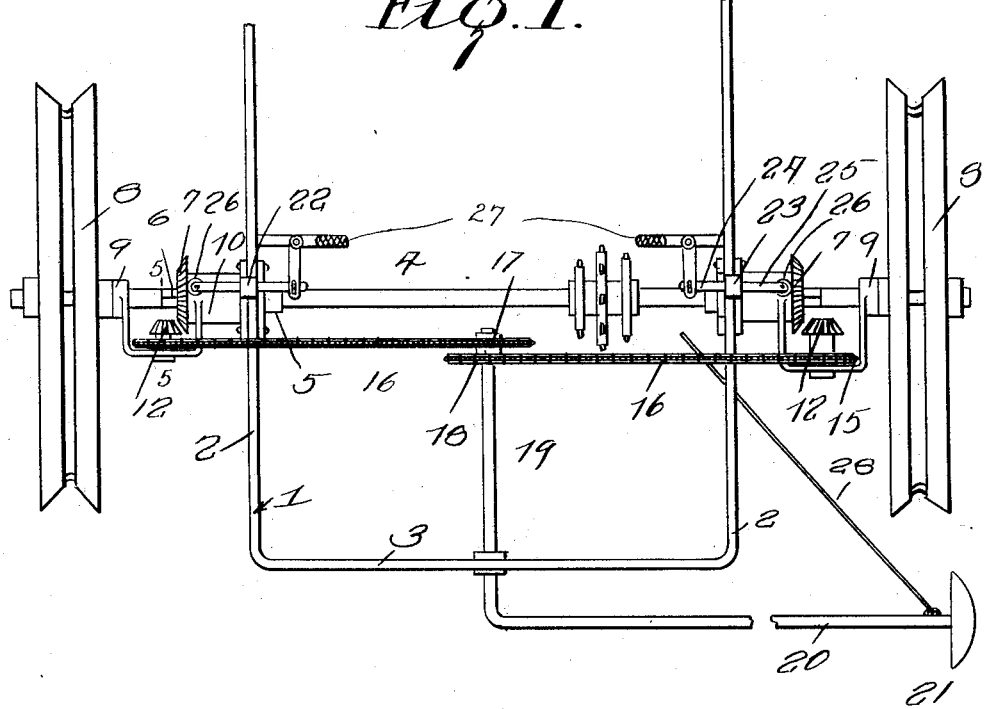
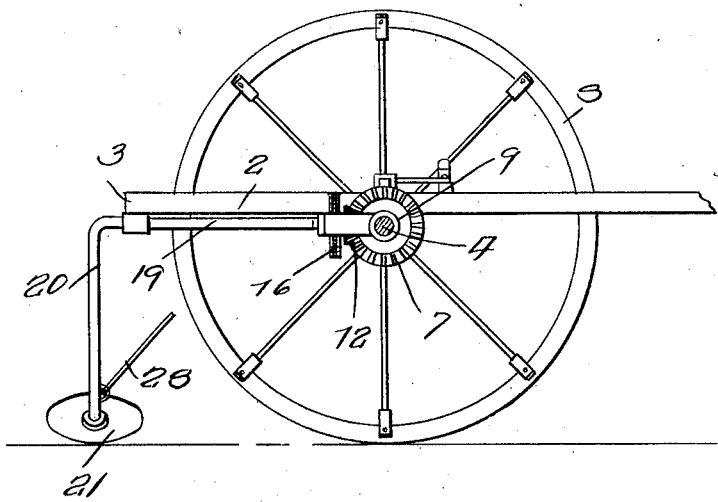
Witnesses
Inventor
G. W. Garvin
By
Attorney

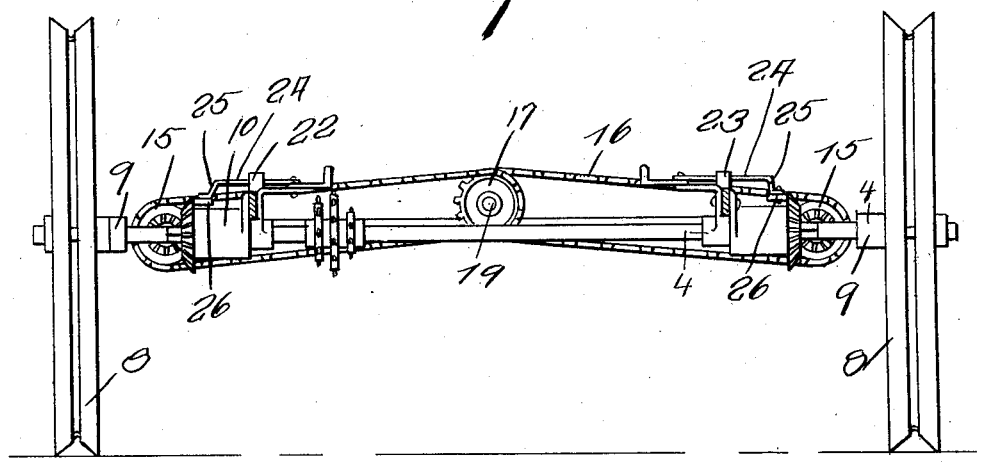
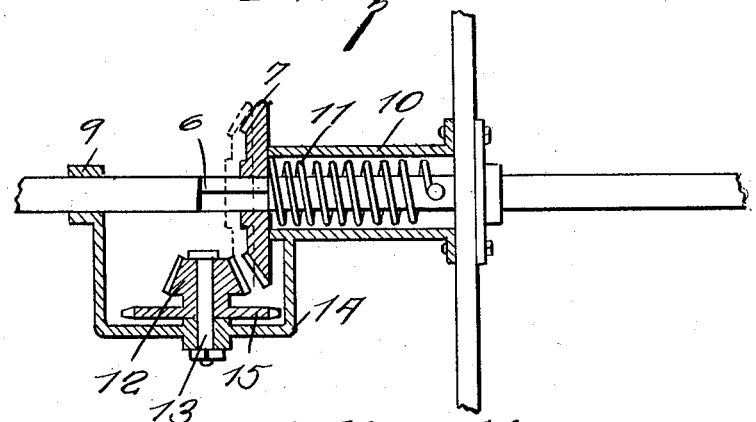
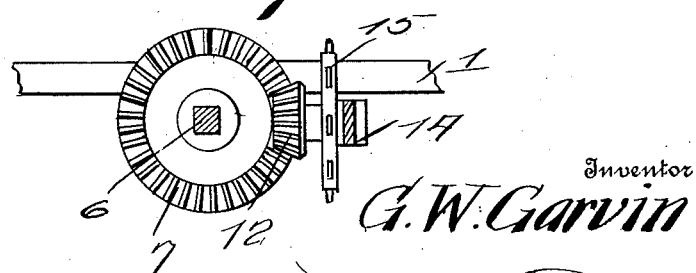

UNITED STATES PATENT OFFICE.

GEORGE W. GARVIN, OF RISING SUN, MARYLAND.

LAND-MARKER.

1,057,050.   Specification of Letters Patent.   Patented Mar. 25, 1913.

Application filed May 17, 1912. Serial No. 697,975.

*To all whom it may concern:*

Be it known that I, GEORGE W. GARVIN, a citizen of the United States, residing at Rising Sun, in the county of Cecil, State of Maryland, have invented certain new and useful Improvements in Land-Markers; and I do hereby declare the following to be a full, clear, and exact description of the invention, such as will enable others skilled in the art to which it appertains to make and use the same.

This invention is directed to improvements in land markers for corn planters or the like, and has for its object to provide a device of this character so constructed that the marker may be swung to either side of the planter by means of foot levers, thus permitting the driver to have the free use of the hands.

With these and other objects in view, this invention resides in the novel features of construction, formations, combinations and arrangements of parts to be hereinafter more fully described, claimed and illustrated in the accompanying drawings, in which:

Figure 1 is a top plan view of the invention. Fig. 2 is a side elevation. Fig. 3 is a front elevation. Fig. 4 is a horizontal sectional view on line 4—4 of Fig. 1. Fig. 5 is a sectional view on line 5—5 of Fig. 1.

Referring to the drawings, the numeral 1 designates the frame of the planter, and consists of side sills 2, and an end sill 3, said frame being supported upon an axle 4 which is journaled in bearings 5 carried by the side sills of said frame. The axle 4 is squared, as at 6, and adjacent the outer ends thereof for slidably supporting beveled gears 7, said gears being compelled to rotate with the axle 4 when the machine is being drawn across a field. Fixed to the outer end of the axle 4 are traction wheels 8. Loosely mounted upon the axle 4, and adjacent the traction wheels 8 are collars 9, said collars being spaced from the outer ends of the sleeves 10 which have their inner ends secured to the side sills 2 and embrace portions of the axle 4.

Surrounding those portions of the axle 4 which are inclosed by the sleeves 10 are coil springs 11, the inner ends of which are secured to the axle. The outer ends of said springs are secured to the inner faces of the gears 7, said springs serving to hold the gears 7 out of mesh with the beveled pinions 12 which are loosely mounted upon the stub shafts 13 which are supported horizontally in the brackets 14. The brackets 14 are supported by the sleeves 10 and collars 9.

Formed integral with the pinions 12 are sprocket wheels 15, over and around which pass sprocket chains 16 which lead therefrom to sprocket wheels 17 and 18 which are fixed to a shaft 19 which is disposed longitudinally of the frame 1, and has fixed to its outer end a marker arm 20, which carries at its outer end a marker blade 21.

Slidably mounted in guides 22 carried by the sleeves 10 and guides 23 carried by the side sills 2 are rods 24, the outer end of each rod being provided with furcations 25, and between which is rotatably mounted a friction wheel 26, which is adapted to bear against the inner face of the gear 7 when said rod is forced outwardly by the foot lever 27.

Leading from the outer end of the arm 20 is a rope 28, which has its inner end secured in convenient reach of the driver so that the same may be grasped to operate the arm and hold the same in its vertical or inoperative position.

From this construction it will be seen that when it is desired to shift the marker blade 21 from one side of the frame to the other, it is only necessary that the driver presses one of the levers 27 downwardly, whereupon the desired rod 24 will be moved outwardly until the friction wheel 26 carried thereby contacts with the adjacent gear 7, whereupon said gear will be thrown into mesh with its connecting pinion 12, thereby rotating the same, and through the sprocket 15 carried thereby and the sprocket chain 16, the shaft 19 will be rocked, thus swinging the arm 20 from one side of the frame to the other. After the soil has been marked upon one side of the machine, and it is desired to mark upon the other, the operation is reversed.

What is claimed is:—

1. The combination with a planter including a frame having side sills, an axle for supporting said frame, wheels for the axle, said axle having squared portions formed near its outer end, a gear slidably mounted thereon, a sleeve mounted upon each side sill, a shaft supported adjacent the axle, a beveled pinion carried by the shaft, a shaft mounted upon the planter frame, sprockets fixed thereto, a marking arm carried by said shaft, means connecting said sprockets and pinions to operate said marking arm, and means for shifting said gears to mesh with the pinions.

2. The combination with a planter comprising a frame including side sills, a shaft mounted on the planter frame, an arm carried by the shaft, a marking blade carried by said arm, said frame being supported by a rotatable axle, wheels for the axle, sleeves secured to the side sills, said axle passing therethrough, squared portions formed near the ends of the axle, gears slidably mounted on the squared portions, coiled springs having one end secured to the axle and the other end to the gears, said springs surrounding the axle and being inclosed by said sleeves, a pinion supported adjacent each end of the axle, a sprocket wheel carried by each pinion, sprocket wheels carried by the shaft and being engaged by sprocket chains which lead from the first named sprocket wheels, and means for causing said gears to alternately mesh with the pinions to rock the shaft.

In testimony whereof, I affix my signature, in presence of two witnesses.

GEORGE W. GARVIN.

Witnesses:
H. B. PATTEN,
J. M. STERRETT.

---

Copies of this patent may be obtained for five cents each, by addressing the "Commissioner of Patents, Washington, D. C."